(12) United States Patent
Georgi et al.

(10) Patent No.: US 9,279,735 B2
(45) Date of Patent: Mar. 8, 2016

(54) MACHINE AND METHOD FOR MONITORING THE STATE OF A SAFETY BEARING OF A MACHINE

(75) Inventors: Jan Georgi, Schweinfurt (DE); Hartmut Walter, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 869 days.

(21) Appl. No.: 13/322,701

(22) PCT Filed: Apr. 16, 2010

(86) PCT No.: PCT/EP2010/055046
§ 371 (c)(1),
(2), (4) Date: Feb. 13, 2012

(87) PCT Pub. No.: WO2010/136264
PCT Pub. Date: Dec. 2, 2010

(65) Prior Publication Data
US 2012/0126648 A1  May 24, 2012

(30) Foreign Application Priority Data
May 27, 2009 (DE) .......................... 10 2009 022 835

(51) Int. Cl.
*H02K 7/09* (2006.01)
*G01L 5/00* (2006.01)
*F16C 19/04* (2006.01)
*F16C 19/18* (2006.01)
*F16C 19/52* (2006.01)
(Continued)

(52) U.S. Cl.
CPC .............. *G01L 5/0009* (2013.01); *F16C 19/18* (2013.01); *F16C 19/522* (2013.01); *F16C 19/525* (2013.01); *F16C 32/0442* (2013.01); *F16C 39/02* (2013.01); *F16C 41/007* (2013.01); *G01M 13/04* (2013.01)

(58) Field of Classification Search
CPC ......... H02K 7/09; F16C 19/52; F16C 19/527; F16C 32/04; F16C 32/0402; F16C 32/0406; F16C 32/044; F16C 32/0442; G01L 5/0009; G01M 13/04
USPC ................... 310/90, 90.5; 73/862.642, 865.8; 340/682; 384/624
IPC ................. H02K 7/09; G01L 5/00; F16C 19/04
See application file for complete search history.

(56) References Cited

U.S. PATENT DOCUMENTS 3,108,264 A * 10/1963 Heinoo ................. G01M 13/04
200/61.4
3,183,043 A * 5/1965 Creeger ................. F16C 19/52
384/624
(Continued)

FOREIGN PATENT DOCUMENTS

CN 101072985 A 11/2007
CN 101305271 A 11/2008
(Continued)

*Primary Examiner* — John K Kim
(74) *Attorney, Agent, or Firm* — Henry M. Feiereisen LLC.

(57) ABSTRACT

An operating method for container quay cranes used to load and unload container ships aided by a PC with a monitor in a crane driver's cabin. The crane driver operates a touchscreen on the monitor, thereby enabling the crane to reach its specified target in a fully or partially automatic manner. Several operating modes, including a training mode, are provided.

11 Claims, 5 Drawing Sheets

(51) Int. Cl.
*F16C 39/02* (2006.01)
*F16C 41/00* (2006.01)
*G01M 13/04* (2006.01)
*F16C 32/04* (2006.01)

(56) References Cited

U.S. PATENT DOCUMENTS

| | | | |
|---|---|---|---|
| 3,508,241 A | 4/1970 | Potter | |
| 4,982,126 A * | 1/1991 | Jolivet | F16C 17/02 310/90 |
| 5,588,754 A * | 12/1996 | Miller | F16C 19/06 310/90.5 |
| 5,602,437 A * | 2/1997 | Shahamat | F16C 19/52 310/68 R |
| 5,677,488 A | 10/1997 | Fontenot | |
| 5,810,485 A | 9/1998 | Arnold | |
| 5,998,894 A * | 12/1999 | Raad | 310/68 B |
| 6,100,809 A * | 8/2000 | Novoselsky | F16C 19/52 340/648 |
| 6,529,135 B1 * | 3/2003 | Bowers | H02P 23/0077 318/806 |
| 6,535,135 B1 * | 3/2003 | French | B61K 9/04 340/682 |
| 6,794,777 B1 * | 9/2004 | Fradella | F16C 32/0457 310/68 B |
| 7,034,711 B2 * | 4/2006 | Sakatani | G01H 1/003 340/682 |
| 7,471,198 B2 * | 12/2008 | Yamamoto | F16C 33/38 235/385 |
| 7,525,430 B2 * | 4/2009 | Nakamura | F16C 41/008 340/539.24 |
| 7,612,665 B2 * | 11/2009 | Okada | F16C 19/52 340/442 |
| 7,652,587 B2 * | 1/2010 | Hohn | F16C 19/525 318/139 |
| 2007/0030162 A1 * | 2/2007 | Okada et al. | 340/682 |
| 2008/0074010 A1 | 3/2008 | Amrhein | |
| 2008/0231128 A1 * | 9/2008 | Buhler et al. | 310/90.5 |
| 2009/0046963 A1 | 2/2009 | Ozaki et al. | |
| 2009/0134727 A1 * | 5/2009 | Coenen | D01H 4/12 310/90.5 |
| 2009/0266169 A1 * | 10/2009 | Marconnet et al. | 73/660 |
| 2010/0030492 A1 * | 2/2010 | Kar et al. | 702/39 |
| 2012/0126648 A1 * | 5/2012 | Georgi et al. | 310/90.5 |

FOREIGN PATENT DOCUMENTS

| | | |
|---|---|---|
| CN | 201212851 Y | 3/2009 |
| DE | 102006019873 B3 | 10/2007 |
| GB | 2297361 A | 7/1996 |
| JP | 8277845 | 10/1996 |
| JP | 2007187461 A | 7/2007 |
| SU | 1739100 A1 | 6/1992 |
| WO | WO 2007128877 A1 | 11/2007 |

* cited by examiner

MACHINE AND METHOD FOR MONITORING THE STATE OF A SAFETY BEARING OF A MACHINE

CROSS-REFERENCE TO RELATED APPLICATIONS

This application is the U.S. National Stage of International Application No. PCT/EP2010/055046, filed Apr. 16, 2010, which designated the United States and has been published as International Publication No. WO 2010/136264 and which claims the priority of German Patent Application, Serial No. 10 2009 022 835.7, filed May 27, 2009, pursuant to 35 U.S.C. 119(a)-(d).

BACKGROUND OF THE INVENTION

The invention relates to a method for monitoring the state of a safety bearing of a machine. The invention also relates to a relevant machine.

To support the rotating rotor shaft in a machine magnetic bearings, which hold the rotating rotor shaft in a floating state, are being used ever more frequently to support the rotor shaft during operation. If the magnetic bearing fails, as a result of a power failure for example, the rotor shaft falls into a safety bearing and is caught by the latter. The safety bearing thus serves to catch the rotor shaft. The safety bearing temporarily takes over the support of the rotor shaft until the rotor shaft has come to a complete standstill. Safety bearings must on the one hand resist the impact when the rotating shaft drops down into the safety bearing and on the other hand guarantee that the rotor shaft coasts safely to a halt. For this purpose the bearing ring of the safety bearing has a slightly larger internal diameter compared to the rotor shaft diameter, so that in normal operation, i.e. when the magnetic bearing is active, the rotor shaft does not touch the safety bearing. Usually the safety bearing is accommodated in the stator housing in the area of the respective end of the rotor shaft.

When catching the rotor shaft the safety bearing will be subjected to considerable stresses which lead to wear on the safety bearing. The life of the safety bearing is shortened by the wear with, in the worst case the safety bearing, because of the heavy wear which can even occur during a single runout of the rotor shaft into the safety bearing, no longer being capable of being used for a further crash even after a single crash of the shaft into the safety bearing. The safety bearings are built into the machine and as a rule cannot be inspected there without dismantling parts of the machine. The optimum moment for replacing a defective or deteriorating safety bearing thus cannot be established with any certainty. The problem has been solved previously by counting the crashes. If a predefined number of crashes of the rotor shaft into the safety bearing is exceeded, e.g. for five crashes, the safety bearing must be replaced. The safety bearing can however already be worn out after fewer than five crashes or also stand up to significantly more crashes. The first case can result in failure of the safety bearing, the second case in unnecessary and expensive downtimes of the machine in order to replace safety bearings that are not yet defective or worn.

The object of the invention is to make it possible to monitor the state of a safety bearing built into a machine.

SUMMARY OF THE INVENTION

The object is achieved by a method for monitoring the state of the safety bearing of the machine, wherein the safety bearing catches a rotor shaft of the machine on failure of a magnetic bearing of the machine, wherein the safety bearing has an outer ring and an inner ring arranged rotatably in relation to the outer ring, wherein the magnetic bearing is switched off, wherein the rotor shaft is rotationally moved with a defined course of movement, wherein a physical variable of the safety bearing is measured by means of a sensor.

This object is also achieved by a machine, wherein the machine has a magnetic bearing and a safety bearing, wherein the safety bearing catches a rotor shaft of the machine on failure of a magnetic bearing of the machine, wherein the safety bearing has an outer ring and an inner ring arranged rotatably in relation to the outer ring, wherein the magnetic bearing is switched off, wherein the rotor shaft is rotationally moved with a defined course of movement, wherein the machine has a sensor by which a physical variable of the safety bearing is able to be measured.

The invention makes it possible to monitor the state of the safety bearing and to recognize whether the safety bearing must be replaced as a result of too much wear.

Advantageous embodiments of the invention may include one or more of the following features.

It proves to be an advantage for the physical variable or for a variable derived from the physical variable to be compared to a target variable and if the deviation of the physical variable or of the derived variable from the target variable exceeds the threshold value, for a warning message to be generated. This makes it possible to automatically detect a worn safety bearing and a user of the machine or service personnel for example are automatically informed if the safety bearing is worn.

It also proves to be an advantage for a safety bearing carrier to be arranged around the outer ring for attaching the safety bearing in the machine, with the sensor being arranged on the side of the outer ring facing towards the safety bearing carrier. The physical variable can be measured especially well at this point.

It also proves to be an advantage for the physical variable to be available in the form of the temperature of the safety bearing or in the form of a force occurring between outer ring and the safety bearing carrier or in the form of oscillations of the safety bearing or in the form of a pressure occurring between outer ring and the safety bearing carrier. Temperature, force, pressure or oscillations represent normal physical variables of a safety bearing which change as the wear on the safety bearing increases.

It also proves to be an advantage for the sensor to be arranged between outer ring and safety bearing carrier since the force transmitted from the safety bearing to the safety bearing carrier can then be determined especially well.

It also proves to be an advantage for the sensor to be embodied flat and embedded in a film or arranged on a film, since then the sensor can be built into the machine in an especially simple manner.

It also proves to be an advantage for a safety bearing carrier to be arranged around the outer ring for attaching the safety bearing in the machine, with the outer ring having a recess on its side facing towards the safety bearing carrier in which at least a part of the sensor is arranged. The sensor can be arranged in an especially simple manner in the recess.

Furthermore it proves to be an advantage for the physical variable to be present in the form of the distance between outer ring and inner ring. The distance between outer ring and inner ring represents a normal physical variable of a safety bearing which changes as wear on the bearing increases.

In this context it proves to be an advantage for at least part of the sensor to be arranged inside the outer ring. The sensor can be arranged in an especially simple manner inside the outer ring.

It also proves to be an advantage for roller bearings to be arranged between outer ring and inner ring or for the inner ring to slide directly in the outer ring. These embodiments represent normal embodiments of the safety bearing.

It further proves to be an advantage for the physical variable to be transmitted via a data link to a computer arranged remotely from the machine. This makes it possible to monitor the safety bearing remotely.

It also proves to be an advantage for the physical variable to be able to be compared to a target variable or to a variable derived from the physical variable and if the deviation of the physical variable or of the derived variable from the target variable exceeds a threshold value, for a warning message to be able to be generated. This makes automatic detection of a worn safety bearing possible and for example automatically informs the user of the machine or service personnel when the bearing is worn.

The machine can be embodied for example as an electric motor or generator or compressor or as a turbine. The machine can especially be embodied as a wind power generator.

BRIEF DESCRIPTION OF THE DRAWING

Exemplary embodiments of the invention are shown in the drawing and are described in greater detail below. The figures show.

DETAILED DESCRIPTION OF PREFERRED EMBODIMENTS

Figure 1:
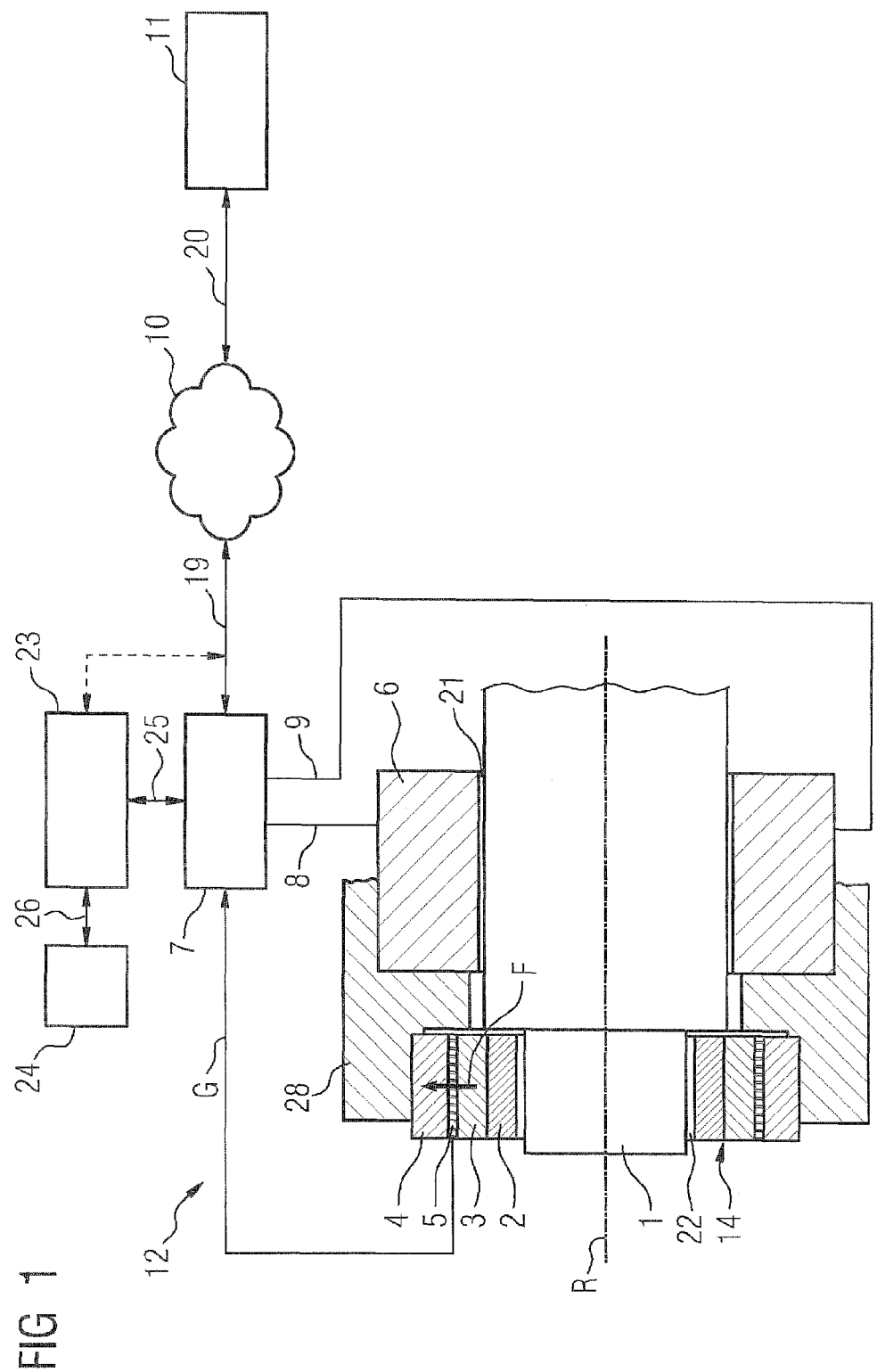
FIG. 1 a schematic diagram of an inventive machine with a safety bearing.

FIG. 1 is a schematic diagram showing the elements of importance for understanding of the invention of a machine 12 which is embodied within the context of the exemplary embodiment as an electric motor. Other elements of the machine, such as rotor yoke etc. for example, are not shown in FIG. 1 for reasons of clarity and since they are not of significance for understanding the invention. The machine 12 has a rotatably arranged rotor shaft 1 supported by means of a magnetic bearing 6 which rotates around an axis of rotation R when the machine 12 is operating.

A magnetic bearing 6 holds the rotor shaft 1 by means of a regulated magnetic field suspended in an air gap 21. For this purpose the magnetic bearing has as its major elements coils for generating the magnetic field.

As well as the magnetic bearing 6 the machine 12 has a safety bearing 14 which catches the rotor shaft 1 if the magnetic bearing 6 fails, when said bearing falls into the safety bearing 14 and the bearing takes over the support of the rotor shaft 1 until the rotor shaft 1 comes to a standstill. Such a failure of the magnetic bearing 6 can for example occur during a failure of the power supply of the machine 12 and thus of the magnetic bearing 6.

The safety bearing 14 has an outer ring 3 and an inner ring 2, arranged rotatably in relation to the outer ring 3. To attach the safety bearing 14 in the machine 12 a safety bearing carrier 4 is arranged around the outer ring 3 wherein, in the context of the exemplary embodiment, the safety bearing carrier 4 is embodied in the shape of a ring and is arranged around the outer side of the outer ring 3. To attach the safety bearing 14 the safety bearing 14 is introduced into the safety bearing carrier 4.

The machine 12 also has a stationary machine housing 28 to which the safety bearing carrier 4 is attached, wherein the attachment between safety bearing carrier 4 and the machine housing 28 is not shown in FIG. 1 for reasons of clarity.

An air gap 22, which is slightly wider than the air gap 21, is arranged between the inner ring 2 and the rotor shaft 1. With the magnetic bearing 6 switched on and functioning normally, the inner ring 2 of the safety bearing 14 thus has no contact with the rotor shaft 1. If the magnetic bearing 6 fails, as a result of a power outage for example, the rotor shaft 1 falls into the safety bearing 14 and there is mechanical contact between the inner ring 2 and the rotor shaft 1 rotating during operation of the machine 12, especially rotating rapidly, which often leads to more rapid wear of the safety bearing 14.

To control and regulate the magnetic bearing 6 the machine 12 has a control device 7 which is connected to the magnetic bearing 6 by electrical leads 8 and electrical leads 9, which are shown within the context of the schematic representation in FIG. 1 as dashes. The controller 7 regulates the magnetic fields generated by the magnetic bearing 6 such that the rotor shaft 1 is held floating in the air gap 21 by the magnetic field. The controller 7 contains the control and regulation functionalities necessary for this purpose. Furthermore the controller 7 contains current converters for controlling the magnetic bearing 6. The measurement devices and feedback paths to the controller 7 necessary to measure the gap between magnetic bearing 6 and rotor shaft 1 for the regulation of the magnetic field are not shown in FIG. 1 for reasons of clarity and because they are not of significance for understanding the invention.

In accordance with the invention the machine 12 has a sensor 5 which measures a physical variable G of the safety bearing. The measured physical variable G is read in in this case within the context of the exemplary embodiment by the controller 7. The physical variable can for example be present in the form of the temperature of the safety bearing or in the form of a force F occurring between the outer ring 3 of the safety bearing 14 and the safety bearing carrier 4 or in the form of oscillations of the safety bearing or in the form of a pressure occurring between outer ring and the safety bearing carrier or in the form of the distance between outer ring and inner ring. In this way the sensor can be used for example as a temperature sensor for measuring the temperature of the safety bearing or as a force sensor for measuring the force F occurring between outer ring and safety bearing carrier or as an oscillation sensor for measuring oscillation of the safety bearing carrier or as a pressure sensor for measuring the pressure occurring between outer ring and safety bearing carrier or as a displacement sensor for measuring the distance between outer ring and inner ring. Within the context of the exemplary embodiment according to FIG. 1 the sensor 5 is embodied here as a force sensor and measures the force F occurring between outer ring 3 and the safety bearing carrier 4. The sensor 5 is arranged between safety bearing carrier 4 and outer ring 3. The sensor 5 is arranged in this way in the force flow between the safety bearing 14 and the safety bearing carrier 4.

Figure 6:
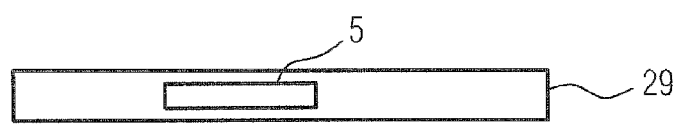
Figure 7:
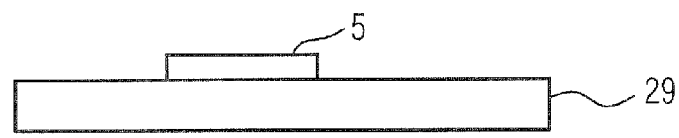

Within the context of the exemplary embodiment according to FIG. 1, the sensor 5 is embodied flat, as shown in FIG. 6 and FIG. 7, and is arranged embedded into a film 29 (see FIG. 6) or arranged on a film (see FIG. 7). The sensor 5 thus forms a so-called sensor film together with the film 29. Within the context of the exemplary embodiment the sensor 5 measures the force F. The sensor film in this case is not shown true-to-scale in the diagram according to FIG. 1 for reasons of clarity but is shown significantly thicker than it is in reality. The measured force F is then, as already described above, read in within the context of the exemplary embodiment by the controller 7. However the sensor film could also, with a corresponding embodiment of the sensor, measure the temperature, the oscillations or the pressure for example, with different sensors also able to be embedded in a common film or arranged on a common film for measuring different physical variables (e.g. temperature sensor and force sensor).

Figure 2:
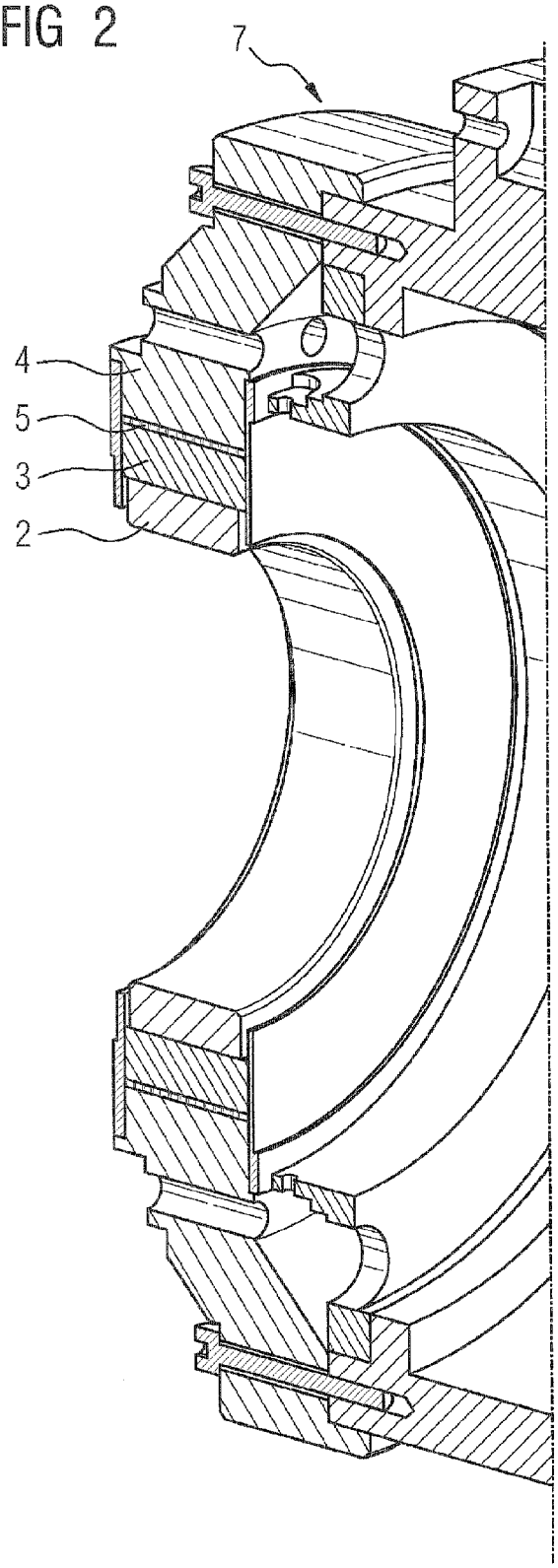
FIG. 2 a sectional view of the safety bearing and of the bearing carrier within the context of an exemplary embodiment of the invention, FIG. 3 a sectional view of the safety bearing and of the bearing carrier within the context of a further exemplary embodiment of the invention, FIG. 4 a safety bearing and a safety bearing carrier within the context of a further exemplary embodiment of the invention, FIG. 5 a flowchart of the inventive method, FIG. 6 a first embodiment of the sensor film, FIG. 7 a second embodiment of the sensor film, FIG. 8 a safety bearing and a safety bearing carrier within the context of a further exemplary embodiment of the invention and FIG. 9 a schematic diagram of a controller of the machine.

FIG. 2 shows a sectional view of the safety bearing and of the bearing carrier 4, with the same elements being labeled with the same reference characters in FIG. 2 as in FIG. 1. In the embodiment of the invention in accordance with FIG. 1 and FIG. 2 the inner ring 2 slides directly in the outer ring 3. The safety bearing is thus embodied as a sliding contact bearing.

Figure 3:
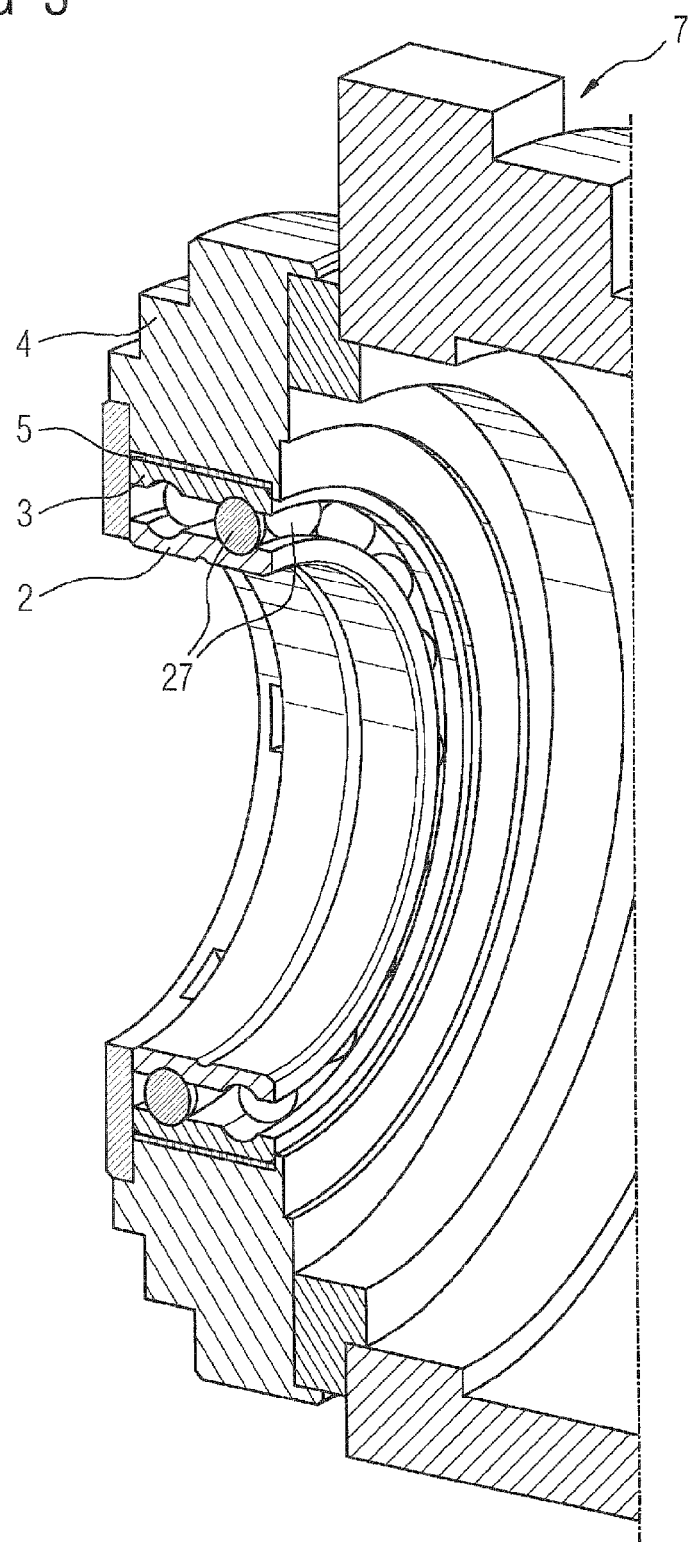

The exemplary embodiment shown in FIG. 3 corresponds in its basic structure essentially to the embodiment described in FIG. 1 and FIG. 2. The same elements are thus provided in FIG. 3 with the same reference characters as in FIG. 1 and FIG. 2. The only significant difference is that, in the exemplary embodiment in accordance with FIG. 3, roller bearings 27 are arranged between the outer ring 3 and inner ring 2, which are embodied within the context of the exemplary embodiment in the form of ball bearings. Within the context of the exemplary embodiment in accordance with FIG. 3 the safety bearing is thus embodied as a roller bearing.

Figure 4:
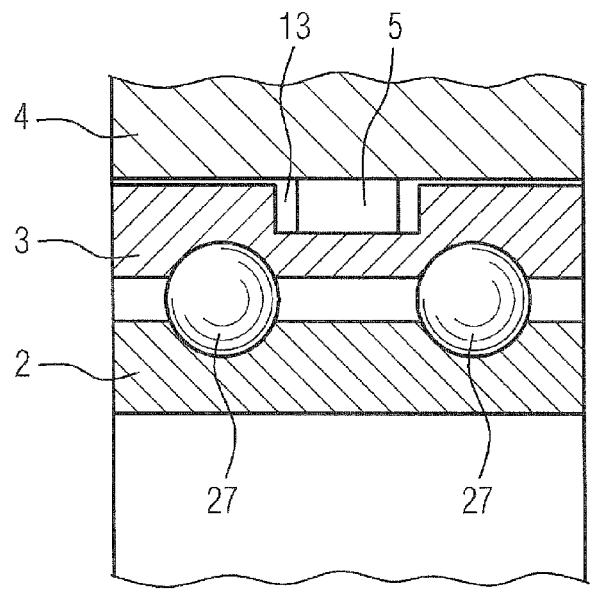

A further embodiment of the invention is shown in FIG. 4 within the context of a schematic diagram, which essentially corresponds to the embodiment according to FIG. 3, with the same elements being provided with the same reference characters as in FIG. 3. The only significant difference from the embodiment in accordance with FIG. 3 is that the sensor 5 is not embodied in the form of a sensor film, but as a conventional force sensor. On its side facing towards the safety bearing carrier 4, the outer ring 3 has a recess 13, in which at least a part of the sensor 5 is arranged. The sensor 5 in this case is arranged on its upper side on the safety bearing carrier 4 and on its lower side on the outer ring 3. Thus the sensor 5 is arranged between outer ring 3 and safety bearing carrier 4 and measures the force F occurring between outer ring and the safety bearing carrier 4. The sensor 5 can however also be embodied as a temperature sensor for measuring the temperature of the safety bearing or as an oscillation sensor for measuring oscillations of the safety bearing or be present as a pressure sensor for measuring the pressure occurring between outer ring and safety bearing carrier. In an embodiment of the sensor 5 as temperature sensor or as oscillation sensor the sensor 5 is preferably arranged completely in the recess 13, i.e. it does not stand proud of the recess 5, as shown in FIG. 4. It should be noted here that the sensor can also be embodied as a sensor film in this embodiment, with at least part of the sensor of the sensor film or the sensor film being able to be arranged completely in the recess 13.

Figure 8:
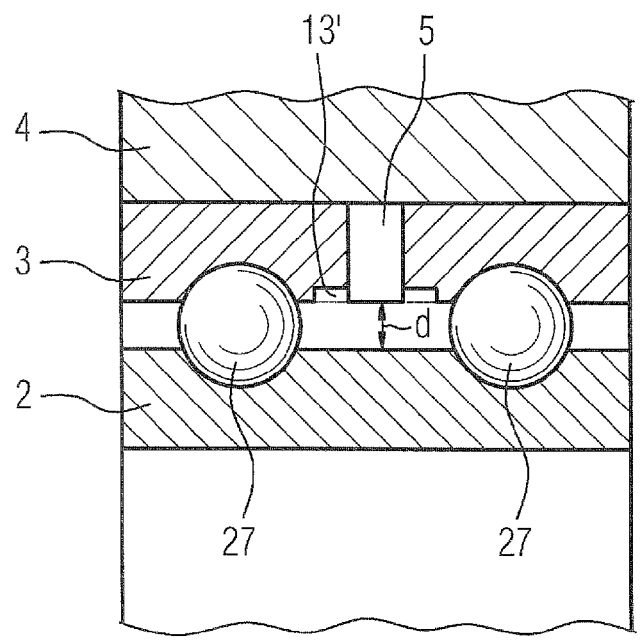

A further embodiment of the invention is shown in FIG. 8 within the context of a schematic diagram which essentially corresponds to the embodiment in accordance with FIG. 3, with the same elements being provided with the same reference characters as in FIG. 3. The only significant difference compared to the embodiment in accordance with FIG. 3 is that the sensor 5 is not embodied in the form of a sensor film but as a conventional displacement sensor for measuring the distance d between outer ring 3 and inner ring 2. Within the context of this exemplary embodiment the outer ring 3 has a recess 13' on its inner side, wherein in the exemplary embodiment a part of the sensor 5 is arranged in the recess 13' and a part of the sensor 5 is arranged inside the outer ring 3. The sensor 5 can however also be arranged completely inside the outer ring 3. The sensor embodied in this exemplary embodiment as a displacement sensor 5 can however also be arranged at another point.

The leads which lead away from the sensor 5 for transmission of the physical variable are preferably routed through the safety bearing carrier 4, a feature which is not shown in the figures the reasons of clarity. Naturally, with an embodiment of the safety bearing as a sliding contact bearing in accordance with FIG. 1 and FIG. 2, the outer ring 3, like the embodiment of the invention in accordance with FIG. 4 and FIG. 8, can have a recess in which at least a part of the sensor 5 or the sensor 5 is completely arranged.

Figure 5:
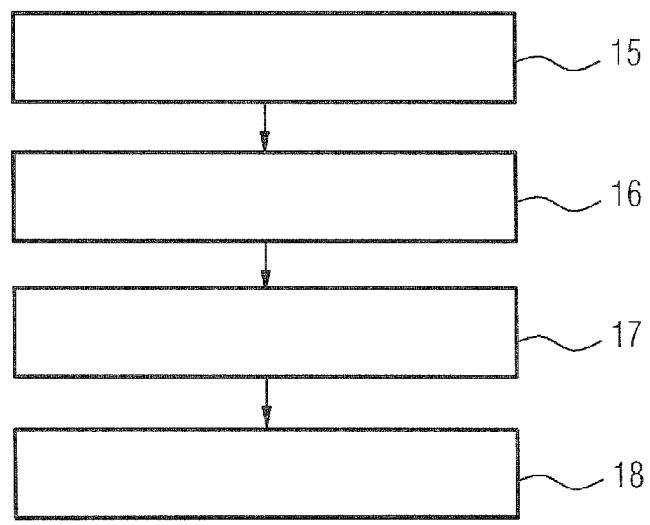
Figure 9:
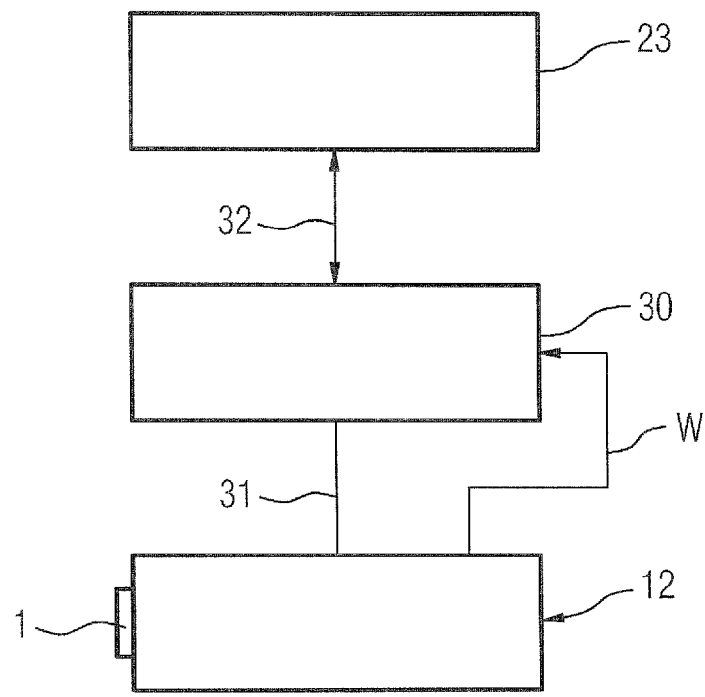

FIG. 5 shows the inventive method for monitoring the state of the safety bearing in the form of a flowchart. In this flowchart, when the method is carried out, in a first step 15 the magnetic bearing 6 is switched off, then in a second step 16 the rotor shaft 1 is moved rotationally with a defined course of movement, with a physical variable G of the safety bearing 14 being measured and stored by means of the sensor 5, after which in a third step 17 the measured physical variable is compared with the target variable and if necessary in a fourth step 18 a warning message is generated if the deviation of the measured physical variable G from the target variable exceeds a threshold value. The execution of the method is explained in greater detail below. In a first step 15 the magnetic bearing 6 is switched off, preferably with the rotor shaft 1 at a standstill. Within the context of the exemplary embodiment the magnetic bearing 6 is switched off by the controller 7. The rotor shaft 1 then falls into the safety bearing 14 and is caught by the latter. Subsequently in a step 16 the rotor shaft 1 is moved rotationally with a defined course of movement. Such a defined course of movement can for example consist of the rotor shaft 1 rotating slowly at a predetermined constant speed over a predetermined period in the safety bearing 14. For this purpose the rotor shaft is driven accordingly by the machine 12, an action which is controlled by a higher-ranking controller 23 (see FIG. 1 and FIG. 9) which can for example be embodied in the form of a numerical control of the machine 12. To this end the higher-ranking controller 23, as shown schematically in FIG. 9, controls the machine 1 embodied within the context of the exemplary embodiment as an electric motor via a drive device 30, which comprises a regulation device and a current converter needed to supply energy to the machine 12. The drive device 30 is connected via electrical leads 31, which are shown schematically in the form of a solid line, to the machine 1. To regulate the speed of the rotor shaft 1 the angle of rotation W of the rotor shaft 1 is transferred from a measurement device integrated in the machine 12 to the drive device 30. The speed at which the rotor shaft 1 is to turn is prespecified in this case to the drive device 30 by the higher-ranking controller 23 via a data connection 32 (e.g. data bus).

During the execution of the defined course of movement in step 16 (see FIG. 5) a physical variable, such as the temperature of the safety bearing or the force F occurring between the outer ring and the safety bearing carrier or the oscillations of the safety bearing or the pressure occurring between outer ring and the safety bearing carrier or the distance between outer ring and inner ring for example, is measured and stored, with the physical variable preferably being stored in the controller 7.

The measured physical variable can subsequently be read out and evaluated by a user locally at the machine for example. The temporal sequence of the physical variable can be shown for this purpose in the form of a diagram on an operating device 24 of the machine for example. To this end the operating advice 24 is linked to the control device 7 via the higher-ranking controller 23 for transmission of data, which is shown by the arrows 25 and 26. The physical variable, which is present in the form of temporally consecutive measured values, is transferred from the control device 7 to the operating device 24 and evaluated there by an operator. For this purpose the sensor transfers the measured values to the control device 7, preferably at constant intervals.

As an alternative or in addition to this, within the context of the exemplary embodiment, the control device 7 is connected via the Internet 10 and/or e.g. via a bus system to a computer 11 arranged remotely from the machine 12 for transmission of data, which is shown by the two arrows 19 and 20 in FIG. 1. The Internet or a bus system are examples of typical data connections in this case. The physical variable, i.e. expressed more precisely the measured values, can be transferred for this purpose from the control device 7 to the computer 11 and evaluated there for example by service personnel. As an alternative, instead of transferring the data directly from the control device 7 via the Internet 10 to the computer 11, this data can also be initially transferred via the connection 25 from the control device 7 to the higher-ranking controller 23 and transferred from there via the Internet 10 for example to the computer 11, which is shown in FIG. 1 by means of a dashed-line arrow.

In addition however an automatic evaluation of the measured physical variable can also be carried out in the control device 7 or in the higher-ranking controller 23 or in the computer 11. To this end, in a step 17 the measured physical variable, which is present in the form of temporally consecutive measured values, is compared with the target variable and if the deviation between measured physical variable and target variable exceeds a threshold value, a warning message is generated in a step 18. The physical variable, as already described, is present in this case in the form of temporally consecutive measured values. The target variable can be determined for example in that, with a newly installed safety bearing with the magnetic bearing switched off, the rotor shaft 1 is moved rotationally with a defined course of movement and the physical variable is measured here and stored as the target variable. The target variable is thus present as a rule in the form of temporally consecutive target values, preferably determined by one-off measurement.

If the deviation between measured physical variable and target variable exceeds a threshold value, in a step 18, depending on where the evaluation is implemented, a warning message is generated by the higher-ranking controller 23 or the control device 7 or the computer 11. The deviation can be defined for example by the amount of the difference of the measured values from the target values being determined.

The warning message notifies the operator on the spot and/or service personnel remote from the machine about a heavily worn safety bearing which must be replaced. The measured physical variable and the target variable are present in such cases, as already stated, generally in the form of temporal sequences. The wear of a safety bearing thus has the general effect, during the defined course of movement, of the temperature of the safety bearing increasing more rapidly and/or higher temperature values being reached than with an unworn bearing. Furthermore it is generally the case for a worn safety bearing compared to an unworn safety bearing, during execution of the defined course of movement, that the measured force and the measured pressure which occur between outer ring of the safety bearing and the safety bearing carrier and/or the distance between outer ring and inner ring are changed and/or unusual or greater oscillations of the safety bearing occur. Within the context of the exemplary embodiment in such cases the force F measured by the sensor 5 is evaluated as the physical variable as described above and if necessary a warning message is generated.

It should be noted at this point that, for measuring the physical variable, the machine can naturally have not only a single, but also a number of sensors which measure the physical variable, e.g. at different points and/or in different directions (e.g. in the case of a force or oscillations). The evaluation can take place separately for each measurement signal of the sensors for example.

It should also be noted at this point that the force occurring between outer ring 3 and the safety bearing carrier can not only act in the radial direction, as indicated in FIG. 1, but also in the tangential direction, i.e. in the direction of the rotational movement of the rotor shaft 1. The sensor 5 can also be embodied so that it measures the force acting in the direction of the rotational movement of the rotor shaft 1. Within the controller 7, e.g. a variable derived from the physical variable can be determined and this can then be compared to a target variable, wherein, if the deviation between the variable derived from the physical variable and the target variable exceeds a threshold value, a warning message is generated. The variable derived from the physical variable can be present in the form of torque for example, which is determined from the force acting in the direction of the rotational movement of the rotor shaft 1 and the distance of the sensor from the axis of rotation R by multiplication of the two variables. The target variable is correspondingly present in this case in the form of a torque. Accordingly variables can also be derived from other physical variables (e.g. temperature, oscillations) and compared with a corresponding target variable for evaluation. Furthermore the force F can be derived for example from the measured distance d between outer ring 3 and inner ring 2.

It should also be noted at this point that the machine can of course also have a number of sensors for measuring different physical variables. Thus for example the machine can also simultaneously have a sensor which measures the temperature of the safety bearing and/or a sensor which measures the force occurring between outer ring and the safety bearing carrier and/or a sensor which measures the oscillations of the safety bearing and/or a sensor which measures the pressure occurring between outer ring and the safety bearing carrier and/or a sensor which measures the distance between outer ring and inner ring. The respective sensor in this case can be arranged corresponding to the sensor 5, e.g. on the side of the outer ring facing towards the safety bearing carrier and can be arranged at least partly or completely in the recess 13 of the outer ring 3 and/or between outer ring and safety bearing carrier and/or at least partly in the inside of the outer ring 3. The measured physical variables are preferably evaluated in parallel in such cases, with each measured physical variable being evaluated as described in FIG. 5 and the associated description for example.

The inventive method makes preventive maintenance possible. The inventive method also enables the safety bearing to be monitored remotely by service personnel without service personnel having to go to the machine on site for this purpose.

The invention claimed is:

1. A method for monitoring wear of a safety bearing of a rotor shaft of a machine, wherein the rotor shaft is supported by a magnetic bearing, the safety bearing having an outer ring and an inner ring arranged for rotation with respect to the outer ring, the method comprising the steps of in the following order:
switching the magnetic bearing off for monitoring the state of the safety bearing,
catching a rotor shaft of the machine with the safety bearing when the magnetic bearing is switched off, and
while the magnetic bearing remains switched off
rotating the rotor shaft with the machine by using a defined motion sequence,
measuring a physical variable of the safety bearing with a sensor, wherein the physical variable is a distance between the outer ring and the inner ring, and
determining the wear of the safety bearing from the measured distance between the outer ring and the inner ring.

2. The method of claim 1, further comprising the steps of:
comparing the measured physical variable or a variable derived from the measured physical variable with a target variable, and
generating a warning message, if a deviation of the physical variable or the derived variable exceeds a threshold value.

3. The method of claim 1, wherein the safety bearing is attached in the machine with a safety bearing carrier arranged around the outer ring, and wherein the sensor is arranged on a side of the outer ring facing the safety bearing carrier.

4. The method of claim 1, wherein the physical variable further comprises a variable selected from the group consisting of a temperature of the safety bearing, a force between the outer ring and the safety bearing carrier, oscillations of the safety bearing, and a pressure between outer ring and the safety bearing carrier.

5. The method of claim 1, wherein the sensor is arranged between the outer ring and the safety bearing carrier.

6. The method of claim 1, wherein the sensor has a flat configuration and is embedded in or arranged on a film.

7. The method of claim 3, wherein at least a part of the sensor is arranged in a recess disposed on the side of the outer ring facing the safety bearing carrier.

8. The method of claim 1, wherein at least part of the sensor is arranged inside the inner ring.

9. The method of claim 1, wherein roller bearings are arranged between the outer ring and inner ring, or wherein the inner ring slides directly in the outer ring.

10. The method of claim 1, wherein the physical variable is transmitted via a data link to a computer arranged remote from the machine.

11. The method of claim 1, wherein the machine is embodied as an electric motor, a generator, a compressor, or a turbine.

* * * * *